US007633520B2

(12) United States Patent

Samarasekera et al.

(10) Patent No.: US 7,633,520 B2

(45) Date of Patent: Dec. 15, 2009

(54) METHOD AND APPARATUS FOR PROVIDING A SCALABLE MULTI-CAMERA DISTRIBUTED VIDEO PROCESSING AND VISUALIZATION SURVEILLANCE SYSTEM

(75) Inventors: Supun Samarasekera, Princeton, NJ (US); Rakesh Kumar, Monmouth Junction, NJ (US); Keith Hanna, Princeton Junction, NJ (US); Harpreet Sawhney, West Windsor, NJ (US); Aydin Arpa, Plainsboro, NJ (US); Manoj Aggarwal, Plainsboro, NJ (US); Vincent Paragano, Yardley, PA (US)

(73) Assignee: L-3 Communications Corporation, New York, NY (US)

( * ) Notice: Subject to any disclaimer, the term of this patent is extended or adjusted under 35 U.S.C. 154(b) by 739 days.

(21) Appl. No.: 10/872,964

(22) Filed: Jun. 21, 2004

(65) Prior Publication Data

US 2005/0024206 A1 Feb. 3, 2005

Related U.S. Application Data

(60) Provisional application No. 60/479,950, filed on Jun. 19, 2003.

(51) Int. Cl.
*H04N 7/18* (2006.01)

(52) U.S. Cl. ....................................... 348/152; 348/143

(58) Field of Classification Search ................. 348/152, 348/143; 345/427, 582; 382/154; 725/131
See application file for complete search history.

(56) References Cited

U.S. PATENT DOCUMENTS

| | | | | |
|---|---|---|---|---|
| 5,164,979 | A | 11/1992 | Choi et al. | |
| 5,182,641 | A | 1/1993 | Diner et al. | |
| 5,276,785 | A | 1/1994 | Mackinlay et al. | |
| 5,289,275 | A | 2/1994 | Ishii et al. | |
| 5,495,576 | A | 2/1996 | Ritchey | |
| 5,696,892 | A * | 12/1997 | Redmann et al. | 345/582 |

(Continued)

FOREIGN PATENT DOCUMENTS

EP 0898245 2/1999

(Continued)

OTHER PUBLICATIONS

Yuille, et al., "Feature Extraction from Faces Using Deformable Templates", Intl J. Computer Vision, 8(2):99-111, 1992.

(Continued)

*Primary Examiner*—Allen Wong
(74) *Attorney, Agent, or Firm*—Tiajoloff and Kelly LLP

(57) ABSTRACT

A scalable architecture for providing real-time multi-camera distributed video processing and visualization. An exemplary system comprises at least one video capture and storage system for capturing and storing a plurality of input videos, at least one vision based alarm system for detecting and reporting alarm situations or events, and at least one video rendering system (e.g., a video flashlight system) for displaying an alarm situation in a context that speeds up comprehension and response. One advantage of the present architecture is that these systems are all scalable, such that additional sensors (e.g., cameras, motion sensors, infrared sensors, chemical sensors, biological sensors, temperature sensors and like) can be added in large numbers without overwhelming the ability of security forces to comprehend the alarm situation.

32 Claims, 8 Drawing Sheets

U.S. PATENT DOCUMENTS

| | | | | |
|---|---|---|---|---|
| 5,708,764 | A | 1/1998 | Borrel et al. | |
| 5,729,471 | A * | 3/1998 | Jain et al. | 725/131 |
| 5,850,352 | A | 12/1998 | Moezzi et al. | |
| 5,850,469 | A | 12/1998 | Martin et al. | |
| 5,963,664 | A | 10/1999 | Kumar et al. | |
| 6,009,190 | A * | 12/1999 | Szeliski et al. | 382/154 |
| 6,018,349 | A | 1/2000 | Szelinski et al. | |
| 6,108,437 | A | 8/2000 | Lin | |
| 6,144,375 | A | 11/2000 | Jain et al. | |
| 6,144,797 | A | 11/2000 | MacCormack et al. | |
| 6,166,763 | A * | 12/2000 | Rhodes et al. | 348/143 |
| 6,424,370 | B1 | 7/2002 | Courtney | |
| 6,476,812 | B1 * | 11/2002 | Yoshigahara et al. | 345/427 |
| 6,512,857 | B1 | 1/2003 | Hsu et al. | |
| 6,522,787 | B1 | 2/2003 | Kumar et al. | |
| 6,668,082 | B1 | 12/2003 | Davidson et al. | |
| 6,985,620 | B2 | 1/2006 | Sawhney et al. | |
| 6,989,745 | B1 | 1/2006 | Milinusic et al. | |
| 7,124,427 | B1 | 10/2006 | Esbensen | |
| 2001/0043738 | A1 | 11/2001 | Sawhney et al. | |
| 2002/0089973 | A1 | 7/2002 | Manor | |
| 2002/0094135 | A1 | 7/2002 | Caspi et al. | |
| 2002/0097798 | A1 | 7/2002 | Manor | |
| 2002/0140698 | A1 | 10/2002 | Robertson et al. | |
| 2003/0014224 | A1 | 1/2003 | Guo et al. | |
| 2003/0085992 | A1 | 5/2003 | Arpa et al. | |
| 2004/0071367 | A1 | 4/2004 | Irani et al. | |
| 2004/0239763 | A1 | 12/2004 | Notea et al. | |
| 2004/0240562 | A1 | 12/2004 | Bargeron et al. | |
| 2005/0002662 | A1 | 1/2005 | Arpa et al. | |
| 2005/0024206 | A1 | 2/2005 | Samarasekera et al. | |
| 2005/0057687 | A1 | 3/2005 | Irani et al. | |

FOREIGN PATENT DOCUMENTS

| | | | |
|---|---|---|---|
| JP | 6-28132 | | 2/1994 |
| JP | 9-179984 | | 7/1997 |
| JP | 10-188183 | | 7/1998 |
| JP | 10-210456 | | 8/1998 |
| JP | 2001-118156 | | 4/2001 |
| WO | WO 96/22588 | | 7/1996 |
| WO | WO 97/37494 | | 10/1997 |
| WO | WO 00/16243 | | 3/2000 |
| WO | WO 00/72573 | | 11/2000 |
| WO | WO 01/67749 | A2 | 9/2001 |
| WO | WO 02/15454 | A2 | 2/2002 |
| WO | WO 03/003720 | | 1/2003 |
| WO | WO 03/067537 | A2 | 8/2003 |
| WO | WO 2004/114648 | A2 | 12/2004 |
| WO | WO 2005/003792 | A2 | 1/2005 |
| WO | WO 2006/017219 | A2 | 2/2006 |

OTHER PUBLICATIONS

Collins, et al., "The Ascender System: Automated Site Modeling from Multiple Aerial Images", Computer Vision and Image Understanding, 72(2), 143-162, Nov. 1998.
Huertas, et al., "Use of IFSAR with Intensity Images for Automatic Building Modeling", IUW 1998.
Jolly, et al., "Vehicle Segmentation and Classification Using Deformable . . . ", IEEE Transactions on Pattern Analysis and Machine Intelligence, vol. 18, Mar. 1996, 293-308.
Noronha, et al., "Detection and Modeling of Buildings from Multiple Aerial Images", DARPA IUW, 1997.
Pope, et al., "Vista: A Software Environment for Computer Vision Research", CVPR 1994, Seattle, 768-772.
Sawhney, et al., "Multi-view 3D Estimation and Applications to Match Move", Proc. of the IEEE Workshop on Multi-view Modeling . . . , Fort Collins, CO, US Jun. 1999.
Shufelt, "Performance Evaluation and Analysis of Monocular Building Extraction . . . ", IEEE Trans. PAMI, 21(4), Apr. 1999, 311-325.
Tao, et al., "Global Matching Criterion and Color Segmentation Based Stereo", Proc. Workshop on the Application of Computer Vision (WAVC2000), Dec. 2000.
Weng, et al., "On Comprehensive Visual . . . ", invited paper in Proc. NSF/ARPA Workshop on Performance vs. Methodology in Computer Vision, Seattle, WA, Jun. 24-25, 1994, 152-166.
Rakesh Kumar, Harpreet Savvhney, Supun Samarasekera, Steve Hsu, Hai Tao, Yanlin Guo, Keith Hanna, Arthur Pope, Richard Wildes, David Hirvonen, Michael Hansen, and Peter Burt,"Arial Video Surveillance and Exploitation," Proceedings of the IEEE, vol. 89, No. 10, Oct. 2001.
Luc Van Gool, Andrew Zisserman, "Automatic 3D Model Building from Video Sequences," Wiley & Sons, Chichester, GB, vol. 8, No. 4, Jul. 1997, pp. 369-378.
Richard Szeliski, "Image Mosaicing for Tele-Reality Applications," Proceedings of the Second IEEE Workshop on Applications of Computer Vision, IEEE Compu. Soc. Press, Los Alamitos, CA, 1994, pp. 44-53.
U.S. Appl. No. 60/479,950, filed Jun. 19, 2003, Samarasekera et al.
State et al., Technologies for Augmented Reality Systems: Realizing Ultrasound-guided Needle Biopsies, 1996(?).
Spann et al., Photogrammetry Using 3D Graphics and Projective Textures, 2000, IAPRS, vol. XXXIII, Amsterdam.
Sequeira et al., Augmented Reality in Multi-camera Surveillance, May 1999, ESCARDA Symposium on Safeguards and Nuclear Material Management, pp. 661-666, Seville, Spain.
Segal et al., Fast Shadows and Lighting Effects Using Texture Mapping, Jul. 1992, Computer Graphics, vol. 26, No. 2, pp. 249-252.
Akesson(?), Augmented Virtuality: A method to automatically augment virtual worlds with video images, Apr. 20, 1998.
Bajura et al., Merging Virtual Objects with Real World, Jul. 1992, Computer Graphics, vol. 26, No. 2, pp. 203-210.
Weinhaus et al., Texture Mapping 3D Models of Real-World Scenes, Dec. 1997, ACM Computing Surveys, vol. 29, No. 4, pp. 325,365.
Simsarian et al., Windows on the World: An Example of Augmented Virtuality, 1997(?).
Kawasaki et al., Automatic Modeling of a 3D City Map from Real-World Video, Oct. 1999, ACM Multimedia '99, pp. 11-18.
Akesson et al., Reality Portals, pp. 11-18, ACM 1999.
Espacenet English Language Abstract for JP 6-28132, Feb. 4, 1994.
Espacenet English Language Abstract for JP 9179984, Jul. 11, 1997.
Espacenet English Language Abstract for JP2001-118156, Apr. 27, 2001.
Espacenet English Language Abstract for JP 10-188183, Jul. 21, 1998.
Patent Abstracts of Japan English language abstract for JP6-28132, Feb. 4, 1994.
Patent Abstracts of Japan English language abstract for JP9179984, Jul. 11, 1997.
Patent Abstracts of Japan English language abstract for JP2001-118156, Apr. 27, 2001.
Vedula et al., Modeling, Combining, and Rendering Dynamic Real-World Events from Image Sequences, 1998(?).
Silicon Graphics, Silicon Graphics Witches Brew UAV, UAV, Nov. 10, 1998.
Dorsey et al, Design and Simulation of Opera Lighting and Projection Effects, Jul. 1991, Computer Graphics, vol. 25, No. 4, pp. 41-50.
Debevec et al., Modeling and rendering architecture from photographis: a hybrid geometry and image-based approach, 1996(?), pp. 1-10.
Kumar et al., 3D Manipulation of Motion Imagery, http://dblp.uni-trier.de, 2000.
Hsu et al., Pose Estimation, Model Refinement, and Enhanced Visualization Using Video, 2000 Conf. on Comp. Vision and Pattern Recog., IEEE Comp. Soc., Jun. 13-15, 2000, SC, USA.
Menet et al., "B-snakes: implementation and application to stereo," Artificial Intelligence and Computer Vision, Elsevier Science, 1991, 223-236.
Weng et al., "Learning based ventricle detection from cardiac MR and CT images," IEEE Trans. Med. 1997.
Patent Abstracts of Japan, English language abstract for JP 10-210456, Published Aug. 7, 1998.

* cited by examiner

100

| |
|---|
| FIG. 3A |
| FIG. 3B |

600

METHOD AND APPARATUS FOR PROVIDING A SCALABLE MULTI-CAMERA DISTRIBUTED VIDEO PROCESSING AND VISUALIZATION SURVEILLANCE SYSTEM

CROSS-REFERENCE TO RELATED APPLICATIONS

This application claims benefit of U.S. provisional patent application Ser. No. 60/479,950, filed Jun. 19, 2003, which is herein incorporated by reference.

BACKGROUND OF THE INVENTION

1. Field of the Invention

Embodiments of the present invention generally relate to image processing. Specifically, the present invention provides a scalable architecture for providing real-time multi-camera distributed video processing and visualization.

2. Description of the Related Art

Security forces at complex, sensitive installations like airports, refineries, military bases, nuclear power plants, train and bus stations, and public facilities such as stadiums, shopping malls, office buildings, are often hampered by 1970's-era security systems that do little more than show disjointed closed circuit TV pictures and the status of access points. A typical surveillance display, for example, is 16 videos of a scene shown in a 4 by 4 grid on a monitor. As the magnitude and severity of threats has escalated, the need to respond rapidly and more effectively to more complicated and dangerous tactical situations has become apparent. Simply installing more cameras, monitors and sensors will quickly overwhelm the ability of security forces to comprehend the situation and take appropriate actions.

The challenge is particularly daunting for sites that the Government must protect and defend. Merely asking personnel to be even more vigilant cannot reasonably guard enormous areas, ranging from army, air and naval bases to extensive stretches of border. In addition, as troops deploy, new security personnel (e.g., reserves) may be utilized who are less familiar with the facility.

Therefore, there is a need for a method and apparatus for providing a scalable architecture for providing real-time multi-camera distributed video processing and visualization that can present an alarm situation to the attention of a security force in a context that speeds up comprehension and response.

SUMMARY OF THE INVENTION

In one embodiment, the present invention generally provides a scalable architecture for providing real-time multi-camera distributed video processing and visualization. An exemplary system comprises at least one video capture and storage system for capturing and storing a plurality of input videos, at least one vision based alarm system for detecting and reporting alarm situations or events, and at least one video rendering system (e.g., a video flashlight system) for displaying an alarm situation in a context that speeds up comprehension and response. One advantage of the present architecture is that these systems are all scalable, such that additional sensors (e.g., cameras, motion sensors, infrared sensors, chemical sensors, biological sensors, temperature sensors and like) can be added in large numbers without overwhelming the ability of security forces to comprehend the alarm situation.

To illustrate, the present invention outlines a highly scalable video rendering system, e.g., the Video Flashlight™ system that integrates key algorithms for remote immersive monitoring of a monitored site, area or scene using a blanket of video cameras. The security guard may monitor the monitored site or area using a live model, e.g., a 2D or 3D model, which is constantly being updated from different directions using multiple video streams. The monitored site or area can be monitored remotely from any virtual viewpoint. The observer can see the entire scene from far and get a bird's eye view or can fly/zoom in and see activity of interest up close. In one embodiment, a 3D-site model is constructed of the monitored site or area and used as glue for combining the multiple video streams. Each video stream is overlaid on top of the video model using the recovered camera pose. The background 3D model and the recovered 3D geometry of foreground objects is used to generate virtual views of the scene and the various video streams are overlaid on top of it.

Coupling a vision based alarm system further enhances the surveillance capability of the overall system. Various alarm detection methods (e.g., methods that detect objects being left behind, methods that detect motion, methods that detect movement of objects against a preferred flow, methods that detect a perimeter breach, methods that count the number of objects and the like) can be deployed in the vision based alarm system. Upon detection of potential alarm situations, the vision based alarm system will report the alarm situations where the security guard will then employ the video rendering system to quickly view and assess the alarm situation.

Namely, the present invention provides tools that act as force multipliers, raising the effectiveness of security personnel by integrating sensor inputs, bringing potential threats to guards' attention, and presenting information in a context that speeds comprehension and response, and reduces the need for extensive training. When security forces can understand the tactical situation more quickly, they are better able to focus on the threat and take the necessary actions to prevent an attack or reduce its consequences.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

Figure 1:
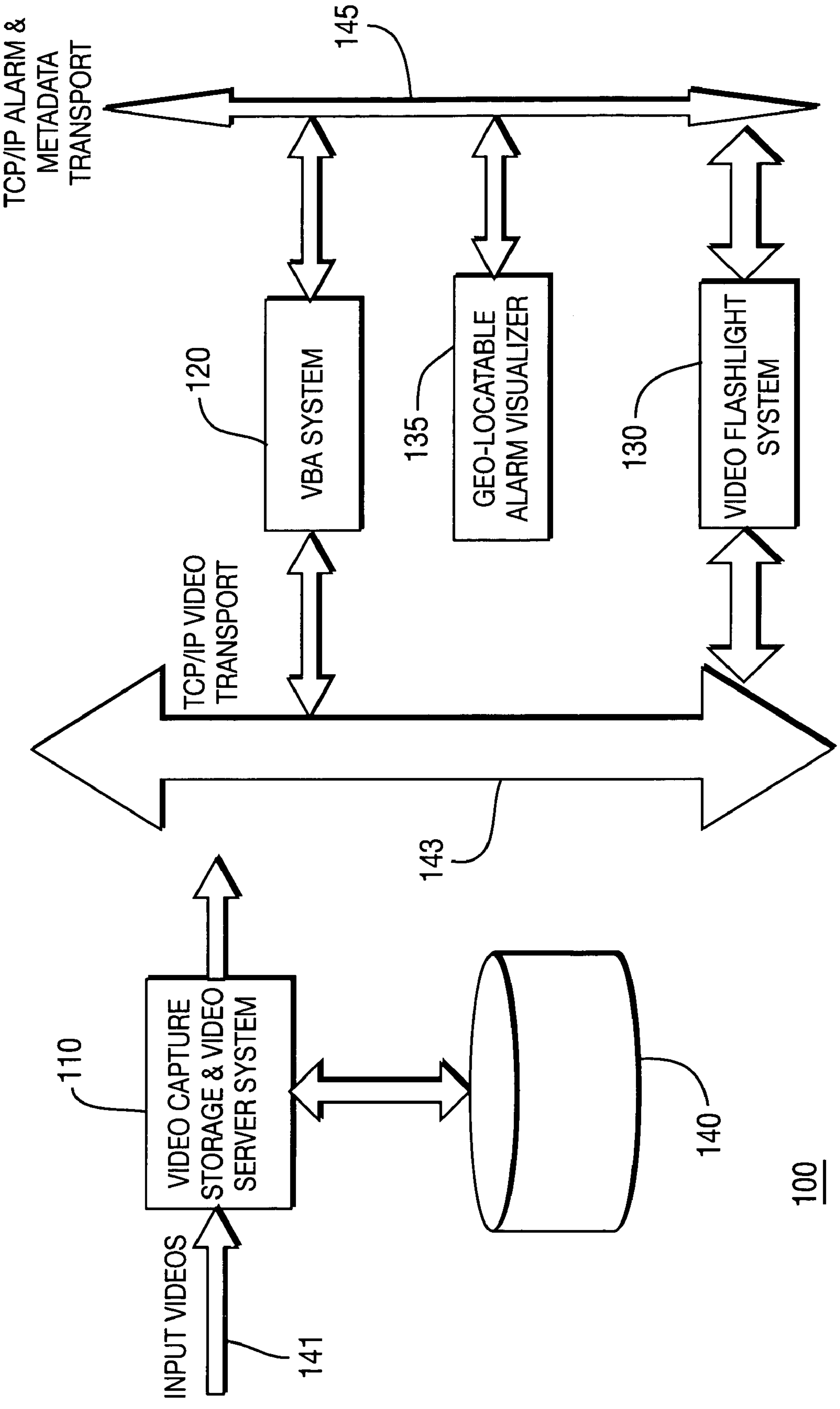
FIG. 1 illustrates an overall architecture of a scalable architecture for providing real-time multi-camera distributed video processing and visualization of the present invention.

FIG. 1 illustrates an overall architecture of a scalable architecture 100 for providing real-time multi-camera distributed video processing and visualization of the present invention. In one embodiment, an overall system may comprise at least one video capture storage and video server system 110, a vision based alarm (VBA) system 120 and a video rendering system, e.g., a video flashlight system 130 and a geo-locatable alarm visualizer 135.

In operation, a plurality of input videos 141 are received and captured by the video capture storage and video server system 110. In one embodiment, the input videos are time-stamped and stored in storage 140. The input videos are also provided to the vision based alarm (VBA) system 120 and the video rendering system 130 via a network transport 143, e.g., a TCP/IP video transport. In turn, a separate optional network transport 145, e.g., a TCP/IP alarm and metadata transport can be employed for forwarding and receiving alarm and metadata information. This second network transport increases robustness and provides a fault-tolerant architecture. However, the use of a separate transport is optional and is application specific. Thus, it is possible to implement the TCP/IP video transport and the TCP/IP alarm and metadata transport as a single transport.

In one embodiment, the geo-locatable alarm visualizer 135 operates to receive alarm signals, e.g., from the VBAs and associated meta-data, e.g., camera coordinates, or other sensor data associated with each alarm signal. To illustrate, if a VBA generates an alarm signal to indicate an alarm condition, the alarm signal may comprise a plurality of meta data, e.g., the type of alarm condition (e.g., motion detected within a monitored area), the camera coordinates of one or more cameras that are currently trained on the monitored area, other sensor metadata (e.g., detecting an infrared signal in the monitored area by an infrared sensor, detecting the opening of a door leading into the monitored area by a contact sensor). Using the alarm and metadata, the geo-locatable alarm visualizer 135 can integrate all the data and then generate a single view with the proper pose that will allow security personnel to quickly view and assess the alarm situations. For example, the geo-locatable alarm visualizer 135 may render annotated alarm icons, e.g., a colored box around an area or an object, on the alarm visualizer display. Additionally, the geo-locatable alarm visualizer can be used to control the viewpoint of the Video Flashlight system by a mouseclick on an alarm region, or by automatic analysis of the alarm and metadata information.

It should be noted that although the geo-locatable alarm visualizer 135 is illustrated as a separate module, it is not so limited. Namely, the geo-locatable alarm visualizer 135 can be implemented in conjunction with the VBA system or the video rendering system. In one embodiment disclosed below, the geo-locatable alarm visualizer 135 is implemented in conjunction with the video rendering system 130.

Effective video security and surveillance applications of the present invention need to handle hundreds and thousands of cameras with real-time intelligent processing, alarm and contextual video visualization, storage and archiving functions integrated in a system. The present invention is a scaleable real-time processing system that is unique in the sense that tens to hundreds to thousands of videos are continuously captured, stored, analyzed and processed in real-time, alerts and alarms are generated with no latency, and alarms and videos can be visualized with an integrated display of videos and 3D models and 2D iconized maps. The display management of thousands of cameras is managed by the use of a video switcher that selects which camera feeds to display at any one time, given the pose of the required viewpoint and the pose of all the cameras. In one embodiment, the Video Flashlights/Vision-based Alarms (VF-VBA) system can typically process 1 Gbps to 1 Terra bits per sec. pixel data from tens of cameras to thousands of cameras using an end-to-end modular and scaleable architecture.

In one embodiment, as the number of cameras is increased, the present architecture allows deployment of a plurality of VBA systems. The VBA systems can be centrally located or distributed, e.g., deployed locally to support a set of cameras or even deployed within a single camera. Thus, each VBA or each of the video cameras may implement one or more smart image processing methods that allow it to detect moving and new objects in the scene and to recover their 3D geometry and pose with respect to the world model. The smart video processing can be programmed for detecting different suspicious behaviors. For instance, it can be programmed to detect left-behind objects in a scene, to detect if moving objects (people, vehicle) are present in a locale or are moving in the wrong or non-preferred direction, to count people passing through a zone and so on. These detected objects can be highlighted on the 3D model and used as a cue to the operator to direct his viewpoint. The system can also automatically move to a virtual viewpoint that best highlights the alarm activity.

Figures 2, 2A, 2B:
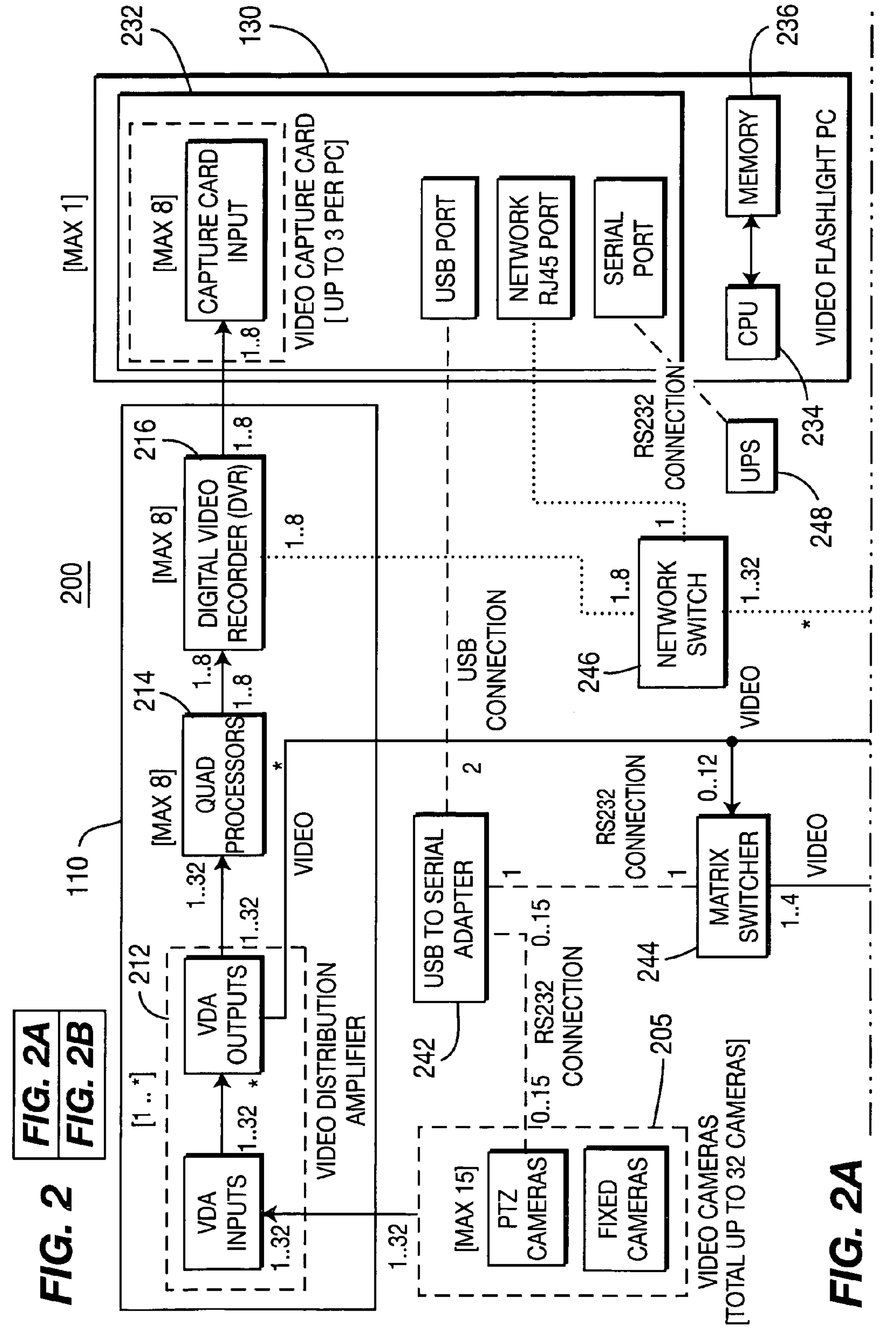
FIG. 2 illustrates a scalable system for providing real-time multi-camera distributed video processing and visualization of the present invention.
Figure 2B:
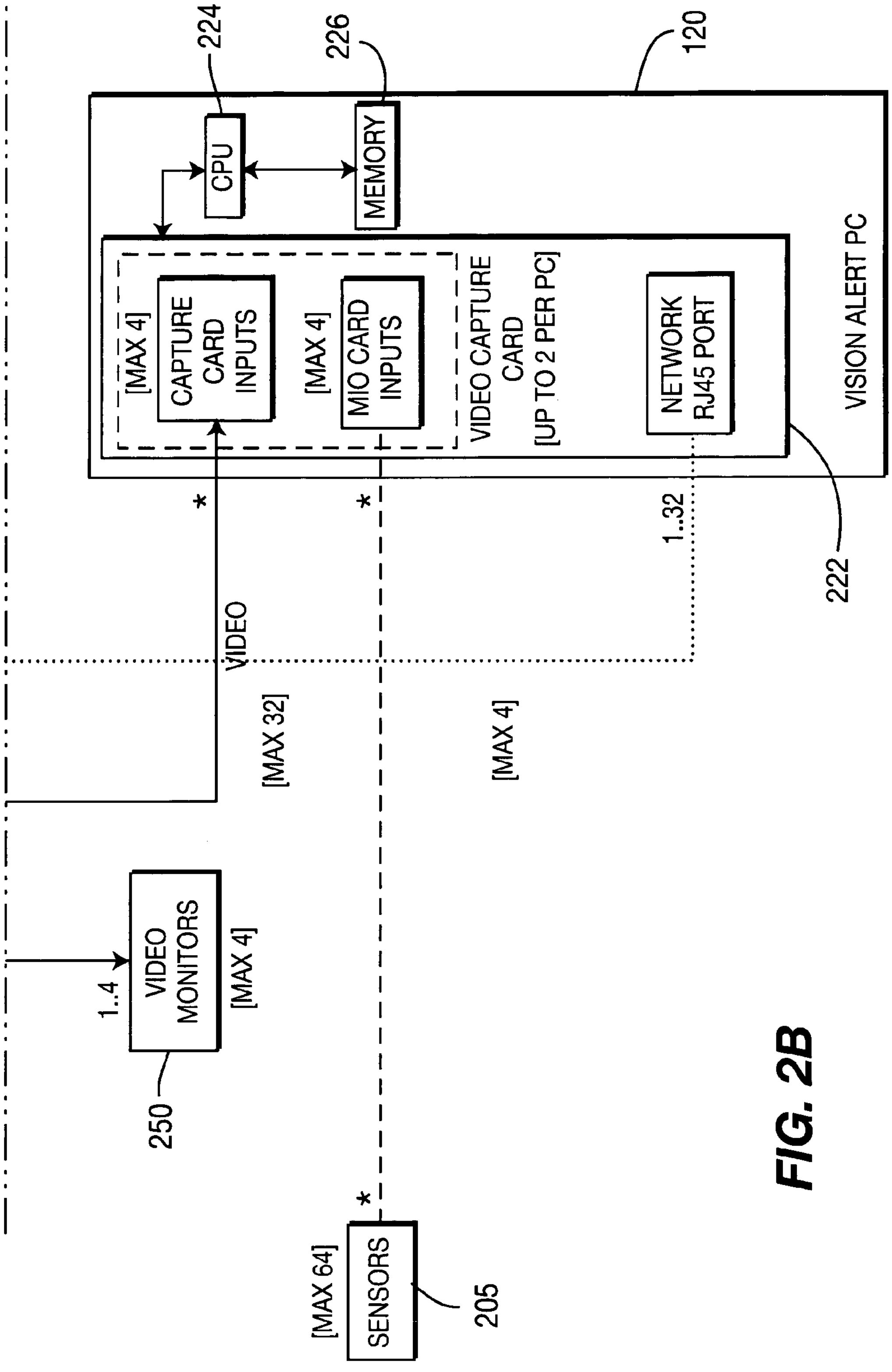

FIG. 2 illustrates a scalable system 200 of the present invention for providing real-time multi-camera distributed video processing and visualization. Specifically, FIG. 2 illustrates an exemplary hardware implementation of the present system. However, since FIG. 2 is only provided as an example, it should not be interpreted to limit the present invention in any way because many different hardware implementations are possible in view of the present disclosure or in response to different application requirements.

The scalable system 200 comprises at least one video capture storage and video server system 110, a vision based alarm (VBA) system or PC 120, at least one video rendering system, e.g., a video flashlight system or PC 130, a plurality of sensors, e.g., fixed cameras, pan tilt and zoom (PTZ) cameras, or other sensors 205, various network related components such as adapters and switches and input/output devices 250 such as monitors.

In one embodiment, the video capture storage and video server system 110 comprises a video distribution amplifier 212, one or more QUAD processors 214 and a digital video recorder (DVR) 216. In operation, video signals from cameras, e.g., fixed cameras and PTZ cameras are amplified by the video distribution amplifier 212 to ensure robustness of the video signal and to provide multiple distribution capability. In one embodiment, up to 32 video signals can be received and amplified, where up to 32 video signals can be distributed to the video flashlight PC and to the VBA PC 120 simultaneously.

In turn, the amplified signals are forwarded to QUAD processors 214 where the 32 video signals are reduced to 8 video signals. In one embodiment, four signals are reduced to one video signal, where the resulting signal may be a video signal having a lower resolution. In turn, the 8 signals are received and recorded by the DVR 216. It should be noted that the videos to the DVR 216 can be recorded and/or simply passes through the DVR to the video flashlight PC 130.

It should be noted that the use of the QUAD processors and the DVR is application specific and should not be deemed as a limitation to the present invention. For example, if a system is totally digital, then the QUAD processors and the DVR can be omitted altogether. In other words, if the video stream is already in digital format, then it can be directed red to the video flashlight PC 130.

The video flashlight PC 130 comprises a processor 234, a memory 236 and various input/output devices 232, e.g., video capture cards, USB port, network RJ45 port, serial port and the like. The video flashlight PC 130 receives the various video signals and is able to render one or more of the input videos over a model, e.g., a 2D or a 3D model of a monitor area. Thus, a user is provided by a real time view of a monitored area. Examples of a video rendering system or video flashlight system capable of applying a plurality of videos over a 2D and 3D model are disclosed in US patent applications entitled "Method and Apparatus For Providing Immersive Surveillance" with Ser. No. 10/202,546, filed Jul. 24, 2002 and entitled "Method and Apparatus For Placing Sensors Using 3D Models" with Ser. No. 10/779,444, filed Feb. 13, 2004, which are both herein incorporated by reference.

The vision alert PC or VBA 130 comprises a processor 224, a memory 226 and various input/output devices 222, e.g., video capture cards, Modular Input Output (MIO) cards, network RJ45 port, and the like. The vision alert PC 120 receives the various video signals and is able to one or more alarm or suspicious conditions. Specifically, the vision alert PC employs one or more detection methods (e.g., methods that detect objects being left behind, methods that detect motion, methods that detect movement of objects against a preferred flow, methods that detect a perimeter breach, methods that count the number of objects and the like). The specific deployment of a particular detection method is application specific, e.g., detecting a large truck in a parking lot reserved for cars may be an alarm condition, detecting a person entering a point reserved for exit only may be an alarm condition, detecting entry of an area after working hours may be an alarm condition, detecting a stationary object greater than a specified time duration within a secured area may be an alarm condition and so on.

Upon detection of potential alarm situations, the vision based alarm system 120 will report the alarm situations, e.g., logging the events into a file and/or forwarding an alarm signal to the video flashlight PC 130. In turn, a security guard will then employ the video rendering system to quickly view and assess the alarm situation.

Thus, a network switch 246 is in communication with the DVR 216, the video flashlight PC 130, and the vision based alarm system 120. This allows the control of the DVR to pass through current videos or to display previously captured videos in accordance with an alarm conditions or simply in response to a viewing preference of a security guard at any given moment.

Similarly, the system 200 employs an adapter 242 that allows the video flashlight PC 130 to control the cameras. For example, the PTZ cameras can be operated to present videos of a particular pose selected by a user. Similarly, the selected PTZ values can also be provided to a matrix switcher 244 where the selected pose will be displayed on one or more primary display monitors. In one embodiment, the matrix switcher 244 is able to select four out of 12 video inputs to be displayed. Thus, in addition to a render video stream provided by the video flashlight PC, one can also see the full resolution videos as captured the cameras as well.

In one embodiment, various sensors 205 are optionally deployed. These sensors may comprise motion sensors, infrared sensors, chemical sensors, biological sensors, temperature sensors and like. These sensors are in communications with MIO cards on the vision alert PC 120. These additional sensors provide additional information or confirmation of an alarm condition detected by the vision alert PC 120.

Finally, an optional uninterruptible power supply (UPS) is also deployed. This additional device is intended to provide robustness to the overall system, where the loss of power will not interrupt the security function provided by the present surveillance system.

Figures 3, 3A:
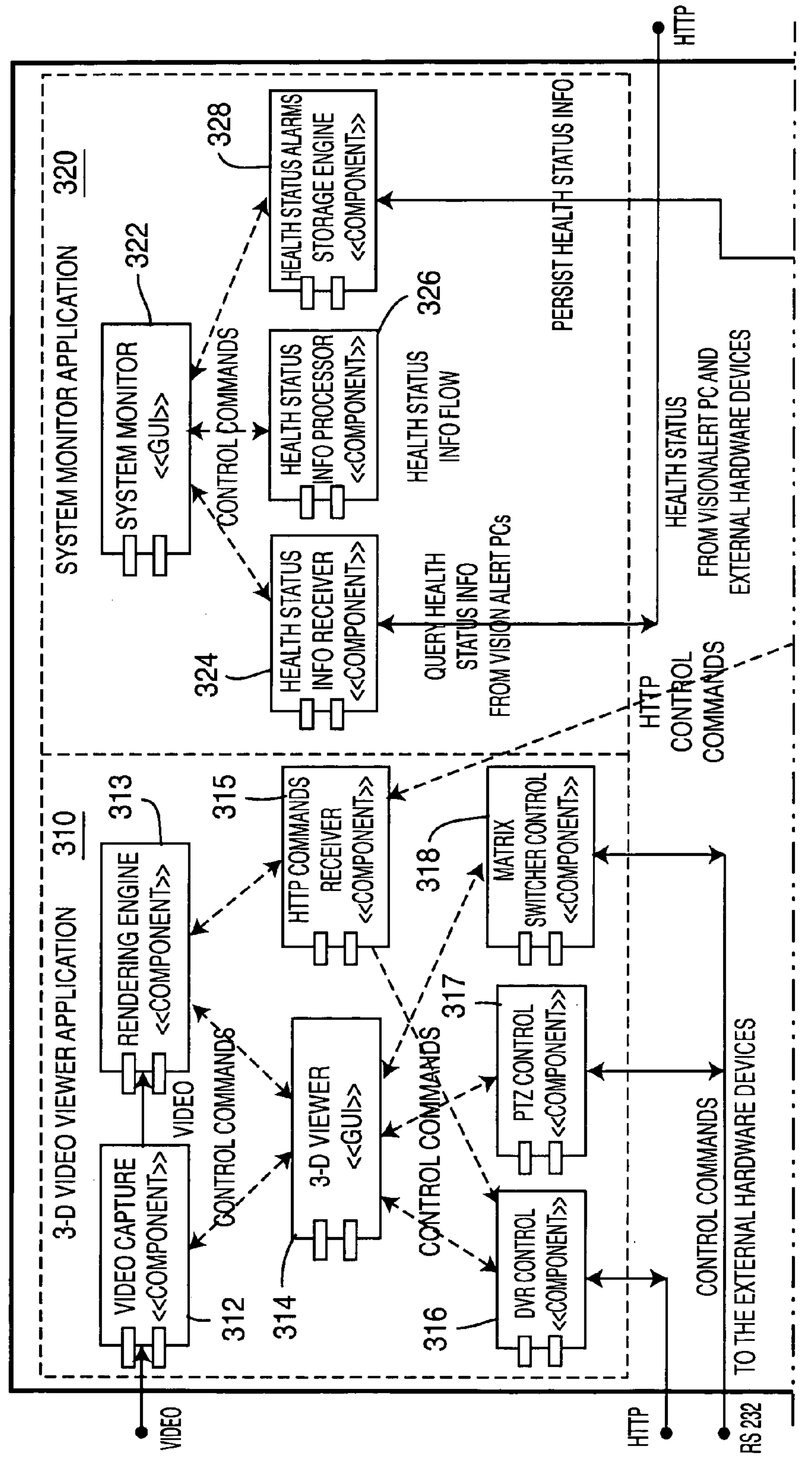
FIG. 3 illustrates a plurality of software modules deployed within the video rendering or video flashlight system of the present invention.
Figure 3B:
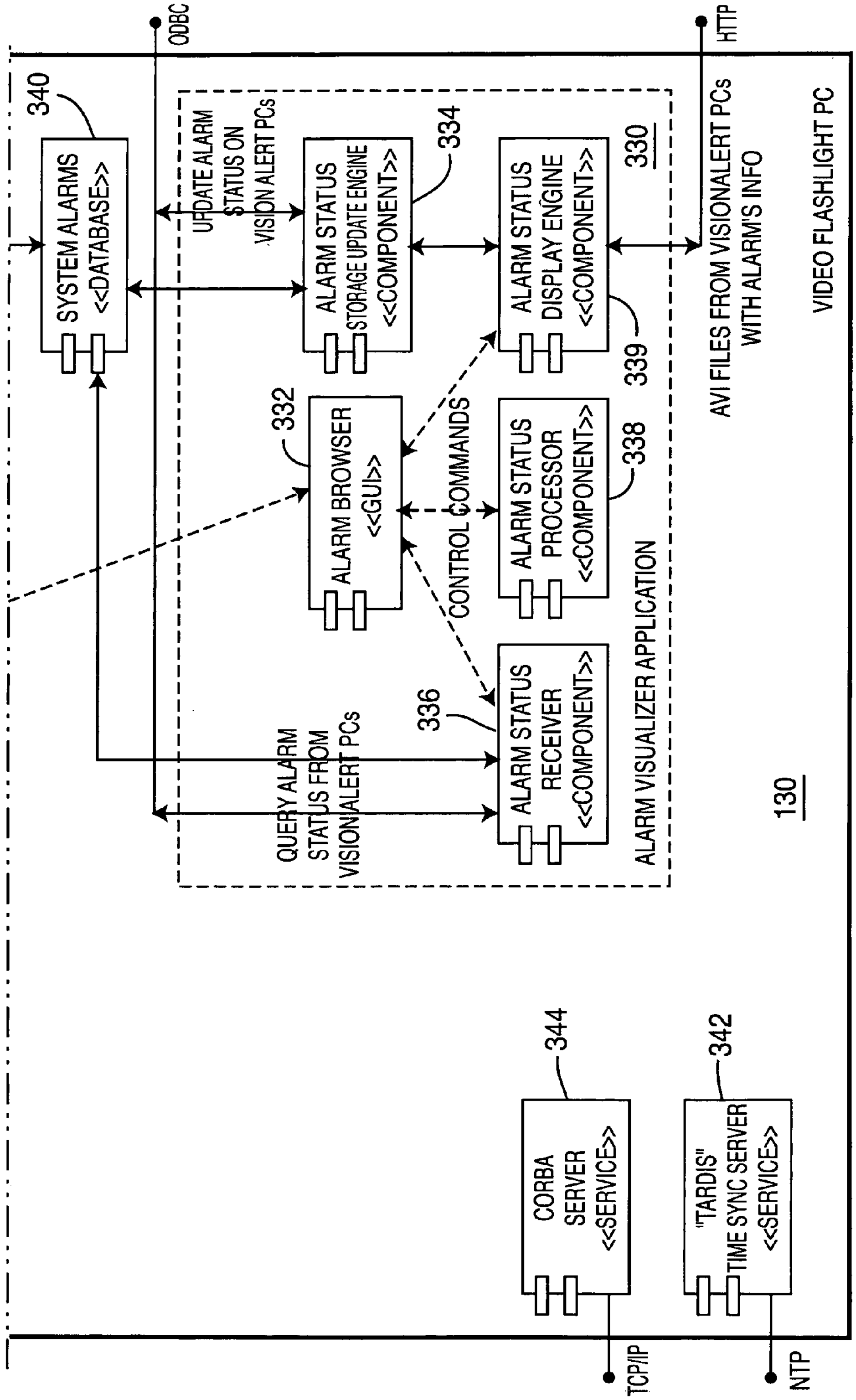

FIG. 3 illustrates a plurality of software modules deployed within the video rendering system or video flashlight PC 130. The video flashlight PC 130 employs three software modules or applications: a 3-D video viewer or rendering application 310, a system monitor application 320, and an alarm visualizer application 330. Although the present invention is described illustratively with various software modules or sub-modules, the present invention is not so limited. Namely, the functions performed by these modules can be deployed in any number of modules depending on specific implementation requirements.

The 3-D video viewer or rendering application 310 comprises a plurality of software components or sub-modules: a video capture component 312, a rendering engine component 313, a 3-D viewer (GUI) 314, a command receiver component 315, a DVR control component 316, a PTZ control component 317, and a matrix switcher component 318. In operation, videos are received and captured by the video capture component 312. In addition to its capturing function, the video capture component 312 also time stamps the videos for synchronization purposes. Namely, since the module operates on a plurality of video streams, e.g., applying a plurality of video streams over a 3-D model, it is necessary to synchronized them for processing.

The rendering engine 313 is the engine that overlays a plurality of video streams over a model. Generally, the model is a 3-D model. However, there might be situations where a 2-D or adaptive 3D model can be applied as well depending on the application. The 2-D model can be a plan layout of a building, for example. Video is shown in the vicinity of the camera location, and not necessarily overlaid on the model. In the adaptive 3D model, video is shown overlaid on the 3D model when the viewer views the scene from a viewing angle or pose that is similar to that of the camera, but is shown in the vicinity of the camera location if the viewing angle or pose is very dissimilar to that of the camera.

The 3-D viewer (GUI) 314 serves as the graphical user interface to allow control of various viewing functions. To illustrate, the 3-D viewer (GUI) 314 controls what videos will be captured by the video capture component 312. For example, if the user provides input indicative of a viewing preference pointing in the easterly direction, then videos from the westerly direction are not captured.

Additionally, the 3-D viewer (GUI) 314 controls what pose will be rendered by the rendering engine 313 by forwarding pose information (e.g., pose values) to the rendering engine 313. The 3-D viewer (GUI) 314 also controls the DVR 216 and PTZ cameras 205 via the DVR control component 316 and the PTZ control component 317, respectively. Namely, the user can select a recorded video stream in the DVR via the DVR control component 316 and control the pan, tilt and zoom functions of a PTZ camera via the PTZ control component 317. For example, a user can click on the 3-D model (e.g., in x,y,z coordinates) and the proper PTZ values will be generated, e.g., by a PTZ pose generation module and sent to the relevant PTZ cameras.

The commands receiver component 315 serves as a port to the alarm visualizer application 330, where a user clicking on the alarm browser 332 will cause the commands receiver component 315 to interact with the rendering engine component 313 to display the proper view. Additionally, if necessary, the commands receiver component 315 may also obtain one or more stored video streams in the DVR to generate the desired view if an older alarm condition is being recalled and viewed.

Finally, the 3-D viewer (GUI) 314 interacts with the matrix switcher control component 318 to obtain full resolution videos. Namely, the user can obtain the full resolution video from a camera output directly.

The alarm visualizer application 330 comprises a plurality of software components or sub-modules: an alarm browser (GUI) 332, an alarm status storage update engine component 334, an alarm status receiver component 336, an alarm status processor component 338 and an alarm status display engine component 339. The alarm browser (GUI) 332 serves as a graphical user interface to allow the user to select the viewing of various potential alarm conditions.

The alarm status receiver component 336 receives status for an alarm condition, e.g., as received by a VBA system or from an alarm database. The alarm status processor component 338 serves to mark whether an alarm is acknowledged and cleared or responded and so on. In turn, alarm status display engine component 339 will display the alarm conditions, e.g., in a color scheme where acknowledged alarm conditions are shown in a green color and unacknowledged alarm conditions are shown in a red color and so on. Finally, the alarm status storage update engine 334 is tasked with updating a system alarms database 340, e.g., updating the status of alarm conditions that have been acknowledged or responded. The alarm status storage update engine 334 may also update the alarm status on the vision alert PC as well.

In one embodiment, the system alarms database 340 is distributed among all the vision alert PCs 120. The system alarms database 340 may contain various alarm condition information, e.g., which vision alert PC reported an alarm condition, the type of alarm condition reported, the time and date of the alarm condition, health of any PCs within the system, and so on.

The system monitor application 320 comprises a plurality of software components or sub-modules: a system monitor (GUI) 322, a health status information receiver component 324, a health status information processor component 326 and a health status alarms storage engine component 328. In operation, the system monitor (GUI) 322 serves as a graphical user interface to monitor the health of a plurality of vision alert PCs 120. For example, the user can click on a particular vision alert PC to determine its health.

The health status information receiver component 324 operates to ping the vision alert PCs, e.g., periodically to determine whether the vision alert PCs are in good health, e.g., whether it is operating normally and so on. If an error is detected, the health status information receiver component 324 reports an error for the pertinent vision alert PC.

In turn, the health status information processor component 326 is tasked with making a decision on the status of the error. For example, it can simply log the error via the health status alarm storage engine 328 and/or trigger various functions, e.g., direct the attention of the user that a vision alert PC is off line, schedule a maintenance request, and so on.

Finally, the video flashlight system 130 also employs a time synch module 342, e.g., a TARDIS time synch server. The purpose of this module is to ensure that all components within the overall system have the same time. Namely, the video flashlight PC and the vision alert PC must be time synchronized. This time consistency serves to ensure that alarm conditions are properly reported in time and that time stamped videos are properly stored and retrieved.

Figure 4:
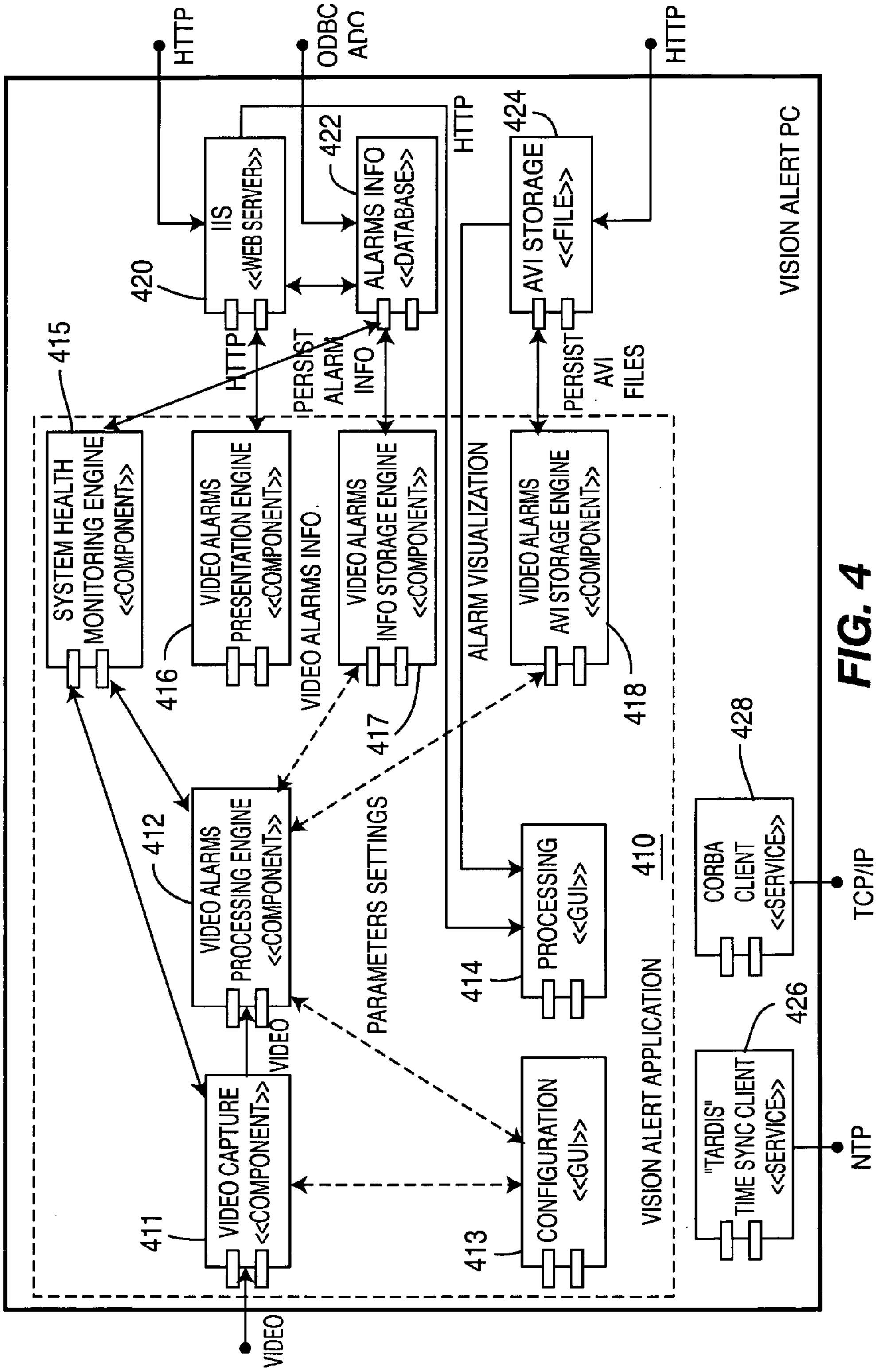
FIG. 4 illustrates a plurality of software modules deployed within the vision alert system of the present invention.

FIG. 4 illustrates a plurality of software modules deployed within the vision alert system 120 of the present invention. The vision alert system 120 employs a vision alert application 410 that comprises a video capture component 411, a video alarms processing engine component 412, a configuration (GUI) 413, a processing (GUI) 414, a system health monitoring engine component 415, a video alarms presentation engine component 416, a video alarms information storage engine component 417 and a video alarms AVI storage engine component 418.

In operation, videos are received and captured by the video capture component 412. In addition to its capturing function, the video capture component 412 also time stamps the videos for synchronization purposes.

The video alarms processing engine component 412 is the module that employs one or more alarm detection methods that detect the alarm conditions. Namely, alarm detection methods such as methods that detect objects being left behind, methods that detect motion, methods that detect movement of objects against a preferred flow, methods that detect a perimeter breach, methods that count the number of objects and the like can be deployed in the video alarms processing engine component 412. The methods that will be selected and/or the thresholds set for each alarm detection method can be configured using the configuration (GUI) component 413. In fact, configuration of which videos will be captured is also controlled by the configuration (GUI) component 413 as well.

The vision alert PC 120 employs one or more network transport, e.g., HTPP and ODBC channels for communications with other devices, e.g., the video flashlight system 130, a distributed database and so on. Thus, the system health monitoring engine component 415 serves to monitor the overall health of the vision alert PC and to respond to pinging from the system monitor application 320 via a network channel. For example, if the system health monitoring engine component 415 determines that one or more of its functions have failed, then it may report it as an alarm condition on the alarms information database 422.

The video alarms presentation engine component 416 serves to present an alarm condition over a network channel, e.g., via an IIS web server 420. The alarm condition can be forwarded to a video flashlight system 130. Additionally, the detection of an alarm condition will also cause the video alarms information storage engine 417 to log the alarm condition in the alarm information database 422. Additionally, the video alarms AVI storage engine 418 will also store a clip of the pertinent videos associated with the detected alarm condition on the AVI storage file 424 so that it can be retrieved later upon request.

In one embodiment, the processing (GUI) component can be accessed to retrieve the stored video clips that is stored in the AVI storage file. The forwarding of the stored video clip can be implemented manually, e.g., upon request by a user clicking on the alarm browser 332, or performed automatically, where certain types of important alarm conditions (e.g., perimeter breach) are such that the video clips are delivered automatically to the video flashlight system for viewing.

Finally, the video flashlight system 120 also employs a time synch module 426, e.g., a TARDIS time synch server. The purpose of this module is to ensure that all components within the overall system have the same time. Namely, the video flashlight PC and the vision alert PC must be time synchronized. This time consistency serves to ensure that alarm conditions are properly reported in time and that time stamped videos are properly stored and retrieved.

The CORBA is a $3^{rd}$ party networks communications program on top of which we have built functions that we use for sending real-time tracking positions, PTZ pose information across the network.

Figure 5:
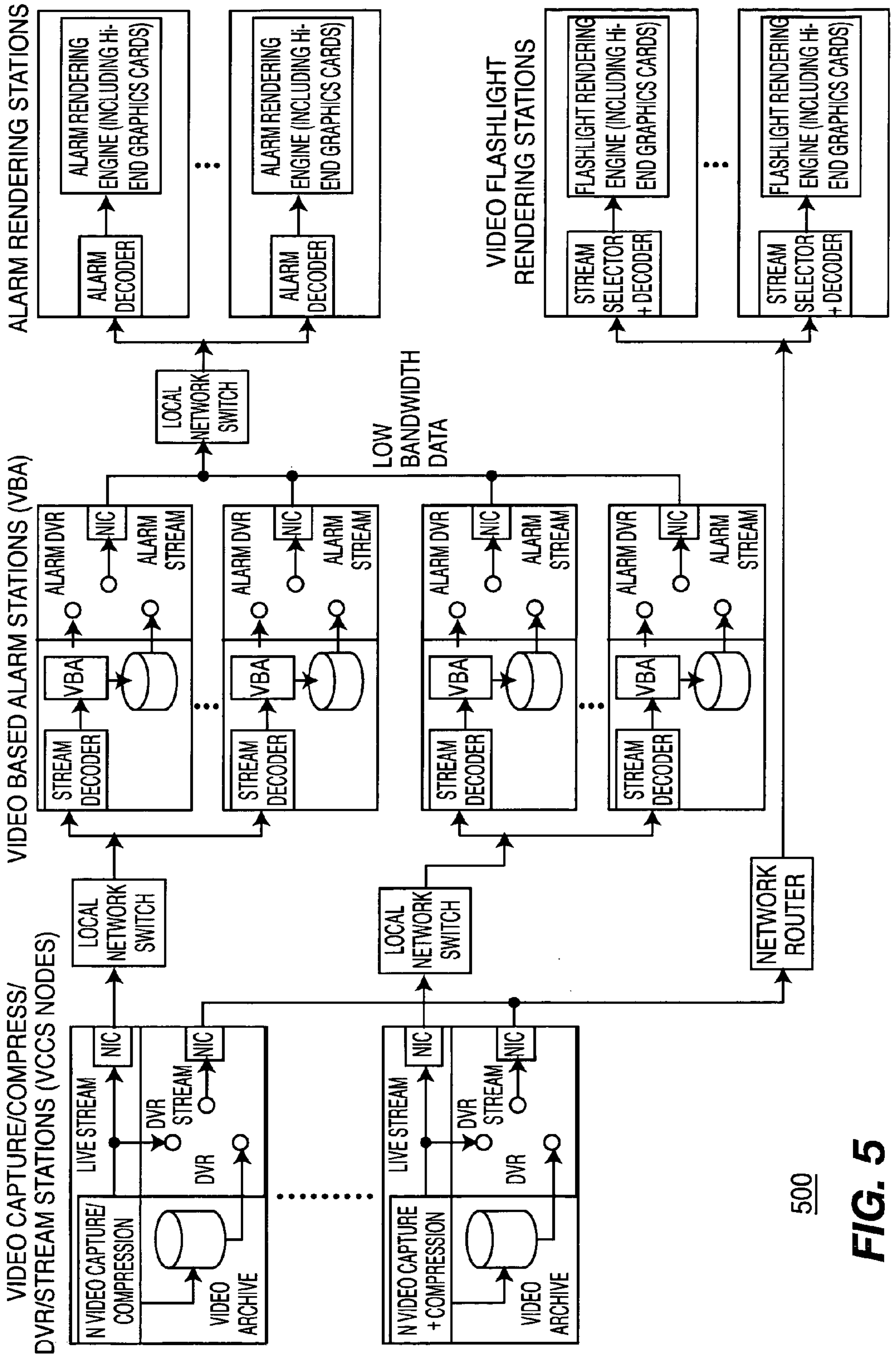
FIG. 5 illustrates an illustrative system of the present invention using digital video streaming.
Figure 6:
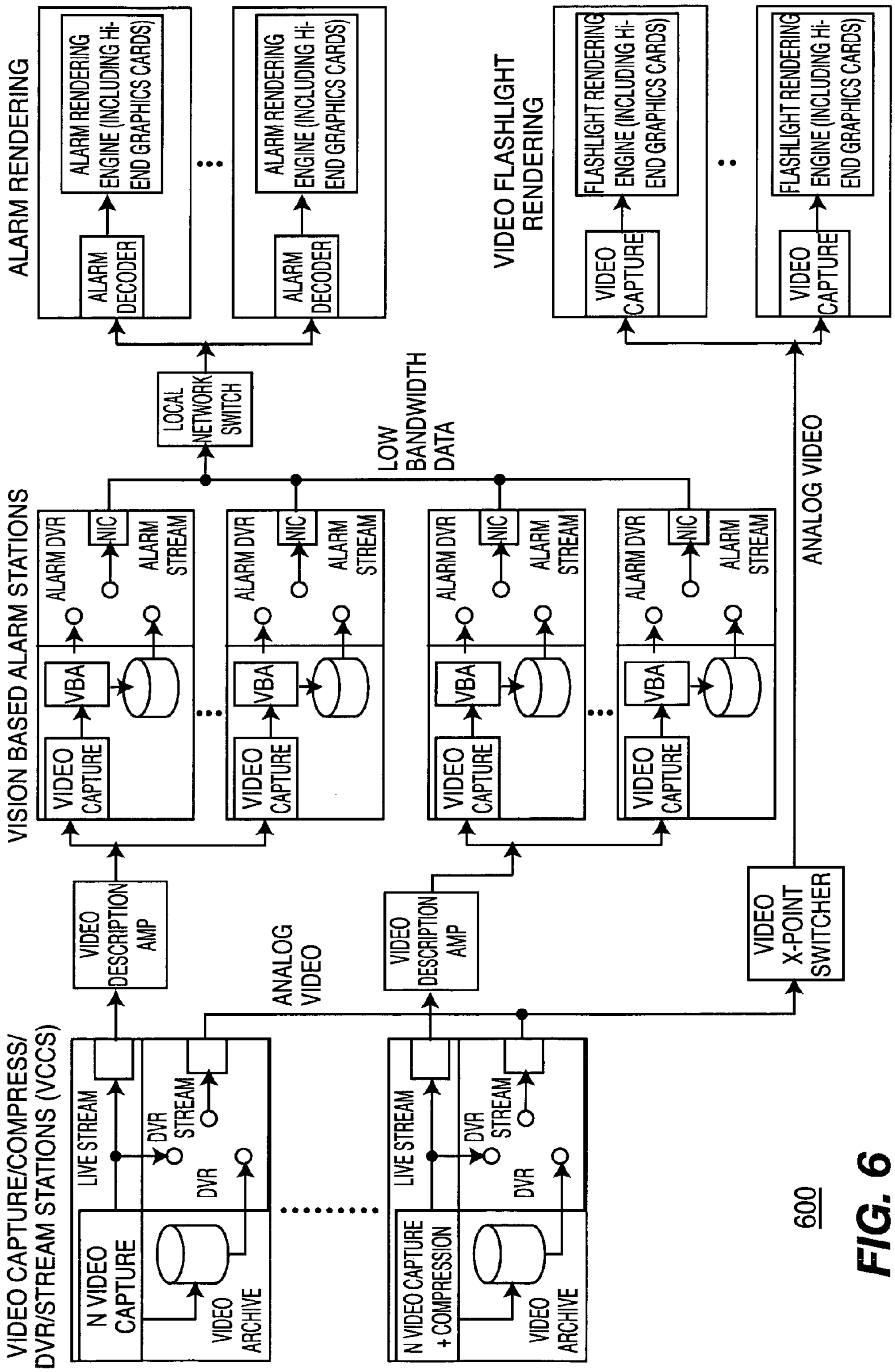
FIG. 6 illustrates an illustrative system of the present invention using analog video streaming.

FIG. 5 illustrates an illustrative system 500 of the present invention using digital video streaming, whereas FIG. 6 illustrates an illustrative system 600 of the present invention using analog video streaming. These illustrative systems are examples of the general scalable architecture as disclosed above. Namely, the present architecture allows a system to easily scale up the number of sensors, video capture/compress stations, vision based alert stations, and video rendering stations (e.g., video flashlight rendering systems or dedicated alarm rendering systems). Namely, the present invention provides tools that act as force multipliers, raising the effectiveness of security personnel by integrating sensor inputs, bringing potential threats to guards' attention, and presenting information in a context that speeds comprehension and response, and reduces the need for extensive training. When security forces can understand the tactical situation more quickly, they are better able to focus on the threat and take the necessary actions to prevent an attack or reduce its consequences.

It should be understood that the various modules, components or applications as discussed above can be implemented as a physical device or subsystem that is coupled to a CPU through a communication channel. Alternatively, these modules, components or applications can be represented by one or more software applications (or even a combination of software and hardware, e.g., using application specific integrated circuits (ASIC)), where the software is loaded from a storage medium (e.g., a magnetic or optical drive or diskette) and operated by the CPU in the memory of the computer. As such, these modules, components or applications (including associated data structures) of the present invention can be stored on a computer readable medium, e.g., RAM memory, magnetic or optical drive or diskette and the like.

Although the present invention is disclosed within the context of a vision alert system, various embodiments of video rendering can be implemented that are not in response to an alarm condition. For example, it is possible to deploy a very large number of cameras along a perimeter such that the video flashlight system is configured to provide a continuous real time "bird's eye view", "walking view" or more generically "virtual tour view" of the perimeter of a monitored area. For example, this configuration is equivalent to a bird flying along the perimeter of the monitored area and looking down. As such, as the view passes from one portion of the perimeter to another portion, the video flashlight system will automatically access the relevant videos from the relevant cameras (e.g., a subset of a total number of available videos) to overlay onto the model while ignoring other videos from other cameras. In other words, the subset of videos will be updated continuously as the view shifts continuously. Thus, it is possible to greatly increase the number of cameras without overwhelming the attention of the security staff.

While the foregoing is directed to embodiments of the present invention, other and further embodiments of the invention may be devised without departing from the basic scope thereof, and the scope thereof is determined by the claims that follow.

The invention claimed is:

1. A method for monitoring a scene with a computerized surveillance system, said method comprising:

constructing a three dimensional computer model of the scene defining surfaces in the scene being monitored, some of said surfaces corresponding to walls in the scene;

receiving a plurality of input videos each from a respective one of a plurality of cameras monitoring the scene; and rendering, by a video rendering system, a view of the scene in real time so as to be viewed by a user, said rendering including applying selectively a subset of said plurality of input videos overlaid onto one or more of the surfaces of the three dimensional model of the scene in response to a pose parameter;

detecting whether an alarm situation exists in the scene being monitored and generating an alarm signal when the alarm situation exists; and selecting, responsive to said alarm signal, said pose parameter so that the rendering is of a view of an area associated with said alarm situation.

2. The method of claim 1, wherein said alarm situation is detected by an alarm detection method.

3. The method of claim 2, wherein said alarm detection method detects motion of objects or new objects within the scene.

4. The method of claim 2, wherein said alarm detection method detects a left behind object within the scene.

5. The method of claim 2, wherein said alarm detection method detects motion of an object in a non-preferred direction within the scene.

6. The method of claim 2, wherein said alarm detection method counts a number of objects within the scene.

7. The method of claim 2, further comprising:

highlighting a portion of the scene to indicate a location associated with said alarm signal.

8. The method of claim 2, wherein said alarm signal is provided by at least one vision based alarm system.

9. The method of claim 1, further comprising:

receiving signals from at least one sensor deployed within the scene.

10. The method of claim 1, wherein said subset of said plurality of input videos is continuously updated to provide a continuous virtual view of the scene.

11. The method of claim 1, wherein said plurality of input videos are provided by a plurality of cameras, wherein at least one of said cameras has pan, tilt and zoom (PTZ) capability.

12. The method of claim 1, wherein said plurality of input videos are provided by a plurality of cameras, wherein at least one of said cameras has pan, tilt and zoom (PTZ) capability, and wherein operation of the PTZ capability of the PTZ camera is controlled by PTZ values generated responsive to the user accessing an interface.

13. The method of claim 1, wherein, responsive to a determination that a viewing angle of one of the input videos from a camera location thereof is sufficiently dissimilar to a viewing angle of the user, said input video is shown in a vicinity of said camera location and not overlaid on said model.

14. The method of claim 1, wherein the pose parameter of the rendering is automatically selected as a virtual viewpoint that best highlights the alarm situation.

15. The method of claim 1, wherein said subset of videos does not include any of the videos that has a view of said surface or surfaces that is occluded by any of the other surfaces of the model.

16. The method of claim 1, further comprising displaying in the view a status of said alarm situation using a first color before said alarm situation is acknowledged; and displaying in the view the status of the alarm situation using a second color different from the first color after said alarm situation is acknowledged.

17. An apparatus for monitoring a scene, said apparatus comprising:

a plurality of cameras providing a plurality of respective input videos;

a vision based alarm system generating an alarm signal when an alarm situation is detected; and a video rendering system having a pre-existing three-dimensional computer model of the scene having surfaces defined therein, some of said surfaces corresponding to walls of the scene, said video rendering system rendering a view in real time so as to be viewed by a user, the rendering including applying selectively a subset of said plurality of input videos overlaid onto one or more of the surfaces of said three-dimensional computer model of the scene in response to a pose parameter;

said pose parameter being selected based on said alarm signal, so that the rendering is of a view of an area of the model associated with said alarm situation.

18. The apparatus of claim 17, wherein said alarm signal is generated by an alarm detection method.

19. The apparatus of claim 18, wherein said alarm detection method detects motion of objects or new objects within the scene.

20. The apparatus of claim 18, wherein said alarm detection method detects a left behind object within the scene.

21. The apparatus of claim 18, wherein said alarm detection method detects motion of an object in a non-preferred direction within the scene.

22. The apparatus of claim 18, wherein said alarm detection method counts a number of objects within the scene.

23. The apparatus of claim 17, further comprising:

at least one sensor deployed within the scene, said sensor providing a sensor signal to said video rendering system.

24. The apparatus of claim 17, wherein said video rendering system highlights a portion of the scene to indicate a location associated with said alarm signal.

25. The apparatus of claim 17, wherein said subset of said plurality of input videos is continuously updated to provide a continuous bird's eye view of the scene.

26. The apparatus of claim 17, wherein at least one of said cameras has pan, tilt and zoom (PTZ) capability.

27. The apparatus of claim 26, wherein, when said pose parameter is selected, a corresponding PTZ value is forwarded to said at least one of said cameras has pan, tilt and zoom (PTZ) capability, and wherein operation of the PTZ capability of the PTZ camera is controlled by PTZ values generated responsive to the user accessing an interface.

28. The apparatus of claim 17, wherein, responsive to a determination that a viewing angle of one of the input videos from a camera location thereof is sufficiently dissimilar to a viewing angle of the user, said input video is shown in a vicinity of said camera location and is not overlaid on said model.

29. The apparatus of claim 17, wherein the pose parameter of the rendering is automatically selected as a virtual viewpoint that best highlights the alarm situation.

30. The apparatus of claim 17, wherein said subset of videos does not include any of the videos that has a view of said surface or surfaces that is occluded by any of the other surfaces of the model.

31. A computer-readable medium having stored thereon a plurality of computer executable instructions that, when executed by a processor, cause the processor to perform the steps of a method for monitoring a scene, said method comprising the steps of:

receiving a plurality of input videos each from a respective one of a plurality of cameras monitoring the scene; and rendering, by a video rendering system, a view of the scene in real time so as to be viewed by a user, said rendering including accessing a pre-existing three dimensional computer model of the scene, said three dimensional model defining surfaces, some of said surfaces being walls in the scene, and applying selectively a subset of said plurality of input videos overlaid onto one or more of the surfaces of said three dimensional model of the scene in response to a pose parameter;

detecting whether an alarm situation exists in the scene being monitored and generating an alarm signal when the alarm situation exists; and selecting, responsive to said alarm signal, said pose parameter so that the rendering is of an area associated with said alarm situation.

32. The computer-readable medium of claim 31, wherein the method further comprises:

automatically selecting as the pose parameter a virtual viewpoint that best highlights said alarm situation; and rendering the view from the pose parameter of said virtual viewpoint.

* * * * *